(12) United States Patent
Namaizawa et al.

(10) Patent No.: US 7,740,202 B2
(45) Date of Patent: Jun. 22, 2010

(54) WING STRUCTURE FOR AIRCRAFT

(75) Inventors: Masaki Namaizawa, Saitama (JP);
Kazuhide Hasegawa, Saitama (JP); Jun Nakazawa, Saitama (JP); Hirohide Azuma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 231 days.

(21) Appl. No.: 11/978,722

(22) Filed: Oct. 30, 2007

(65) Prior Publication Data

US 2008/0128552 A1 Jun. 5, 2008

(30) Foreign Application Priority Data

Nov. 2, 2006 (JP) ............................. 2006-299008

(51) Int. Cl.
*B64C 3/18* (2006.01)
(52) U.S. Cl. ............................... 244/123.1; 244/117 R; 244/118; 244/131
(58) Field of Classification Search ............. 244/123.1, 244/123.2, 123.3, 123.4, 123.8, 123.9, 124, 244/131, 117 R, 119; 29/897.32; 52/634, 52/630, 650.1, 799.1, 798.1; 72/347, 348, 72/349, 379.2; 428/596, 603
See application file for complete search history.

(56) References Cited

U.S. PATENT DOCUMENTS

| 2,233,969 | A | * | 3/1941 | Woods | ................... 244/123.8 |
| 4,452,657 | A | * | 6/1984 | Hamm | ...................... 156/198 |
| 6,114,012 | A | * | 9/2000 | Amaoka et al. | ............. 428/182 |
| 6,786,452 | B2 | * | 9/2004 | Yamashita et al. | ....... 244/123.1 |

FOREIGN PATENT DOCUMENTS

| JP | 2000-506816 A | 6/2000 |
| JP | 2002-302097 A | 10/2002 |
| WO | WO 97/34734 A1 | 9/1997 |

* cited by examiner

*Primary Examiner*—Michael R Mansen
*Assistant Examiner*—Joshua J Michener
(74) *Attorney, Agent, or Firm*—Birch, Stewart, Kolasch & Birch, LLP

(57) ABSTRACT

In a wing structure for an aircraft, a rib extends in a chord direction for connecting spars to each other with upper and lower stringer through holes through which stringers of skins pass being formed in upper and lower edges of the rib. A bead is formed on the rib so as to extend between the upper and lower stringer through holes. Upper and lower ends of the bead are formed into arcuate shapes so as to surround the upper and lower stringer through holes, respectively. Thus, it is possible to enhance the buckling strength of the rib against a shear load acting on the wing of the aircraft.

20 Claims, 5 Drawing Sheets

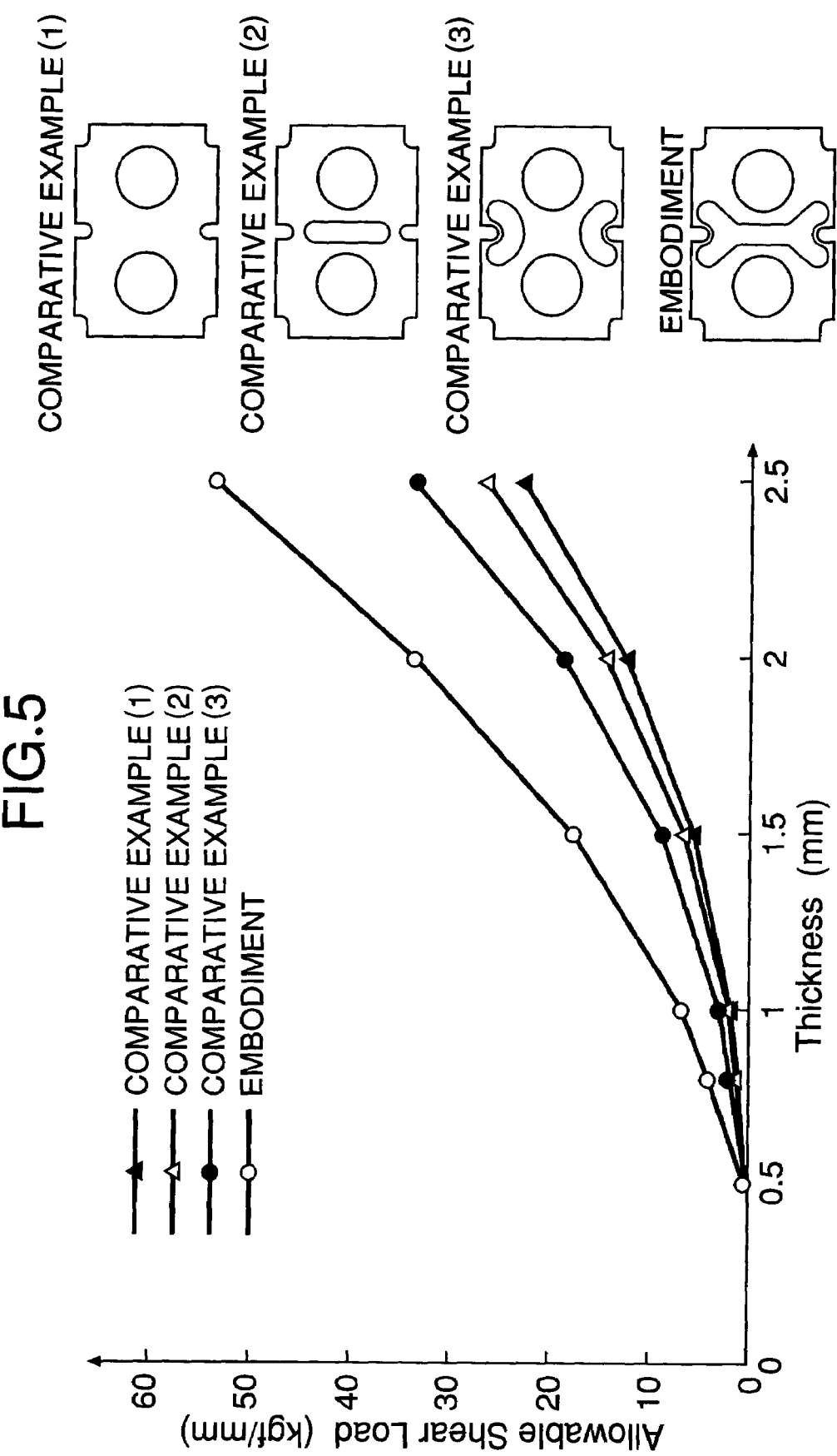

WING STRUCTURE FOR AIRCRAFT

CROSS-REFERENCE TO RELATED APPLICATIONS

The present application claims priority under 35 USC 119 to Japanese Patent Application No. 2006-299008 filed on Nov. 2, 2006 the entire contents of which are hereby incorporated by reference.

BACKGROUND OF THE INVENTION

1. Field of the Invention

The present invention relates to a wing structure of an aircraft, wherein a plurality of spars extend in a span direction; a plurality of stringers are arranged between the spars and extend in the span direction, a rib extends in a chord direction to connect the spars to each other and skins are provided for covering upper and lower surfaces of the spars, the stringers and the rib.

2. Description of Related Art

A wing structure of aircraft is known as described in Japanese Patent Application Laid-open No. 2002-302097 and Published Japanese Translation No. 2000-506816 of PCT Application No. PCT/US97/04550.

More specifically, a rib defining the airfoil of an aircraft wing is formed by press molding a thin plate-shaped material for weight reduction. Stringer through holes are formed on the upper and lower edges of the rib, and stringers are fixed on the inner surfaces of the skins of the wing and are passed through the stringer through holes with a gap therebetween. The wing has a box structure having a resistance against bending and torsion, and includes spars, stringers, ribs and skins connected to each other. However, when a lift or a drag acts on the wing, there is a possibility that the rib formed of a thin plate-shaped material is buckled by a shear load. To solve this problem, in the wing structure described in Japanese Patent Application Laid-open No. 2002-302097 or Published Japanese Translation No. 2000-506816, a bead extending in the vertical direction (wing thickness direction) is formed integrally on the rib when the rib is press-molded, thereby increasing the buckling strength of the rib against the shear load.

However, it is difficult to compensate for the reduction in strength of the rib due to stringer through holes formed therein, merely by forming the bead extending in the vertical direction (wing thickness direction) on the rib. In order to secure a sufficient strength, the wall thickness of the rib is required to be increased along with an increase in the weight.

SUMMARY OF THE INVENTION

The present invention has been achieved in view of the above-described circumstances, and has an object to increase the buckling strength of a rib against a shear load acting on the wing of an aircraft.

In order to achieve the above object, according to an embodiment of the present invention, there is provided a wing structure of an aircraft wherein a plurality of spars extend in a span direction with a plurality of stringers arranged between the spars and extending in the span direction. A rib extends in a chord direction to connect the spars to each other with skins that cover upper and lower surfaces of the spars, the stringers and the rib. Upper and lower stringer through holes through which the stringers pass are formed on upper and lower edges of the rib. A bead is formed on the rib so as to extend relative to each other in the vertical direction. Upper and lower ends of the bead are formed into arcuate shapes so as to surround the upper and lower stringer through holes, respectively.

A main spar 13 and a front spar 14 correspond to the spar in an embodiment of the present invention. An upper skin 19 and a lower skin 20 correspond to the skin in an embodiment of the present invention. A front rib 21 corresponds to the rib in an embodiment of the present invention.

In a conventional structure, if stringer through holes through which stringers of upper and lower skins pass are formed on an upper edge and a lower edge of a rib which connects spars to each other, the buckling strength of the rib against a shear load caused by a lift or a drag of the wing is decreased due to the stringer through holes formed in the rib. Thus, a box structure of the wing comprising the spars, the skins, and the ribs is deformed, leading to a possibility that the shape of the airfoil is changed. However, in the arrangement of an embodiment of the present invention, the bead extending between the upper and lower stringer through holes is formed on the rib, and the upper and lower ends of the bead are formed into arcuate shapes so as to surround the upper and lower stringer through holes. Therefore, the buckling strength of the rib against the shear load is effectively enhanced, thereby suppressing the deformation of the wing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a graph for explaining the effect of the embodiment.

DESCRIPTION OF THE PREFERRED EMBODIMENT

Figure 1:
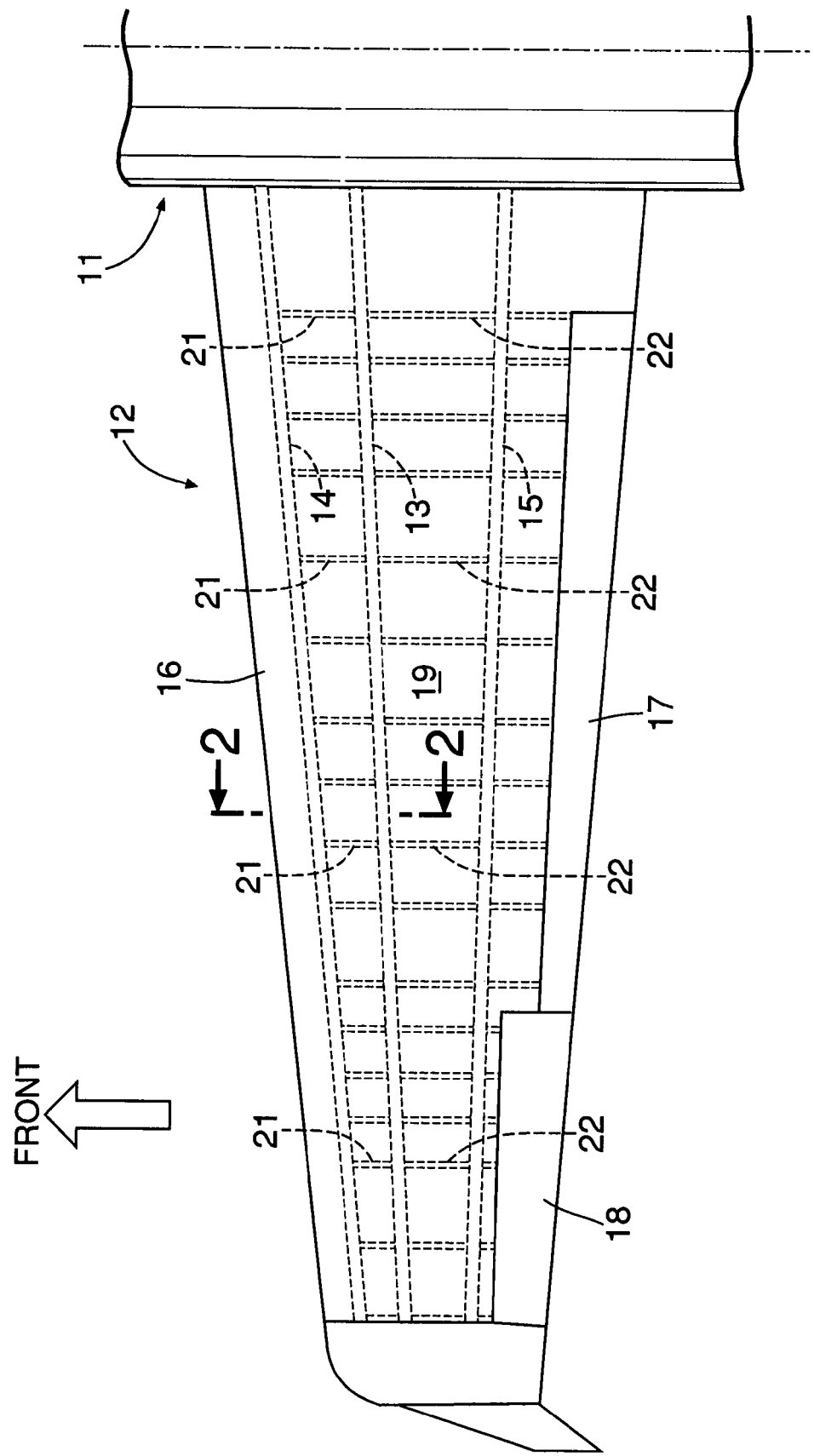
FIG. 1 is a top view of a left main wing of an aircraft including a wing structure according to an embodiment of the present invention.
Figure 2:
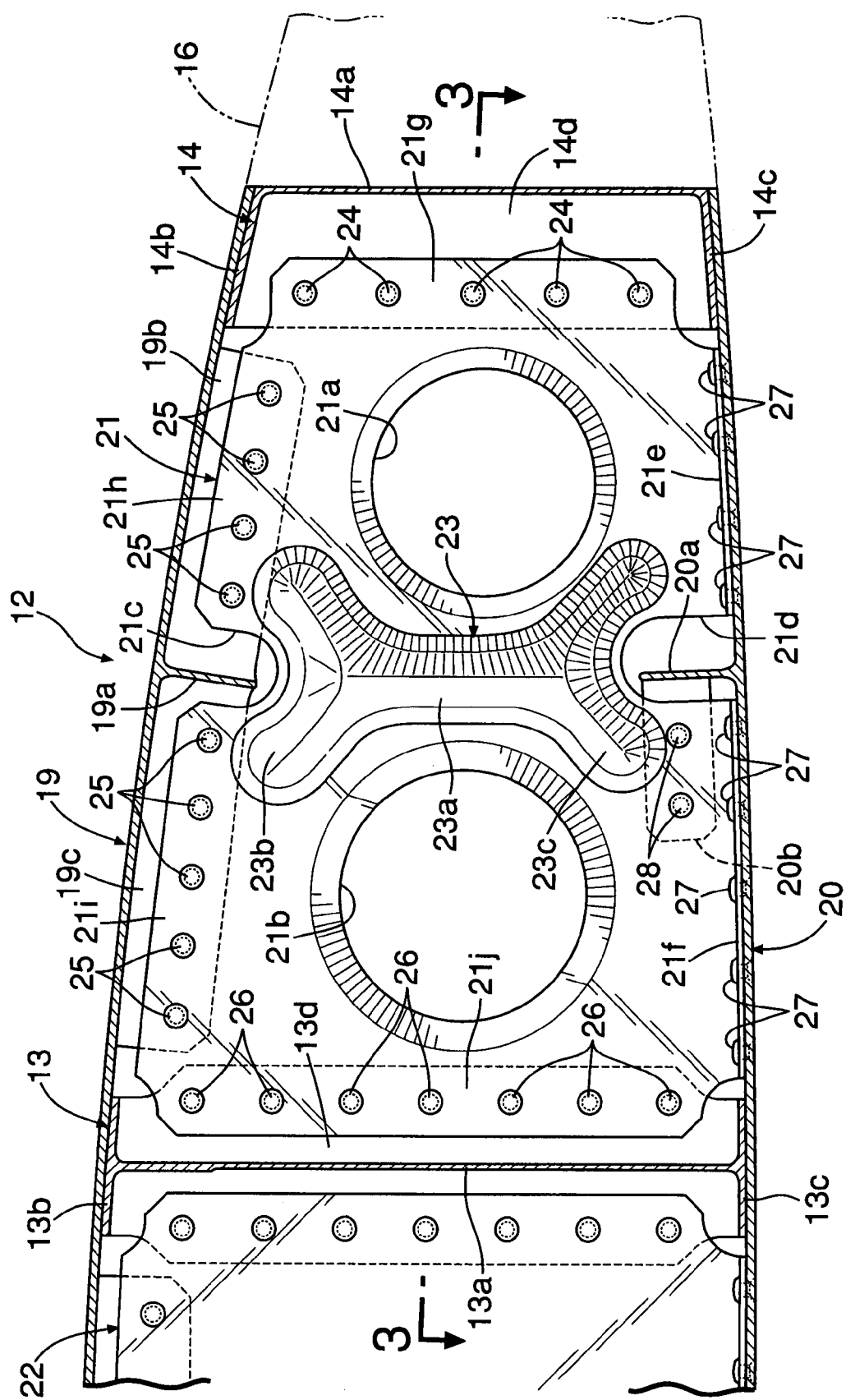
FIG. 2 is an enlarged sectional view taken along line 2-2 in FIG. 1.
Figure 3:
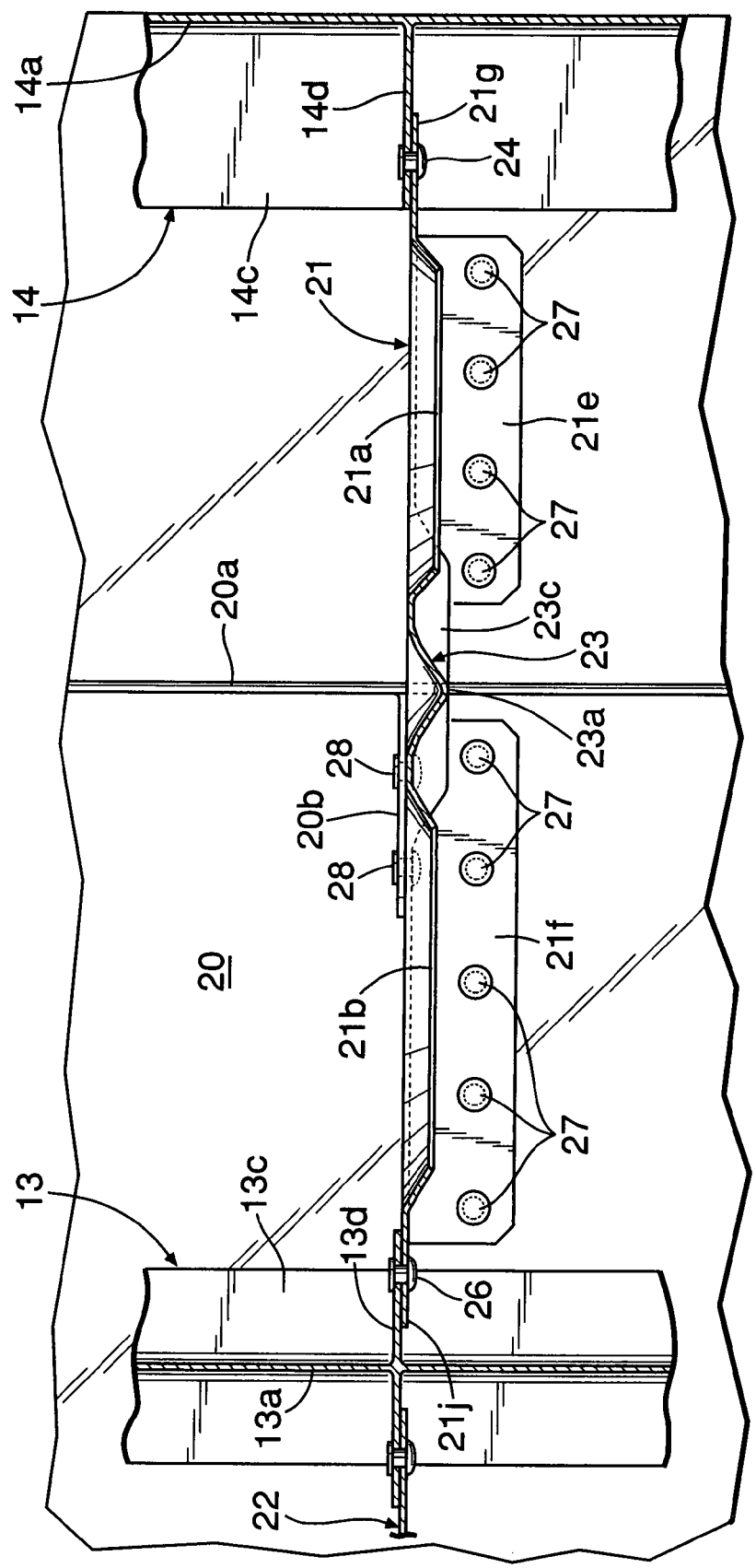
FIG. 3 is a sectional view taken along line 3-3 in FIG. 2.
Figure 4:
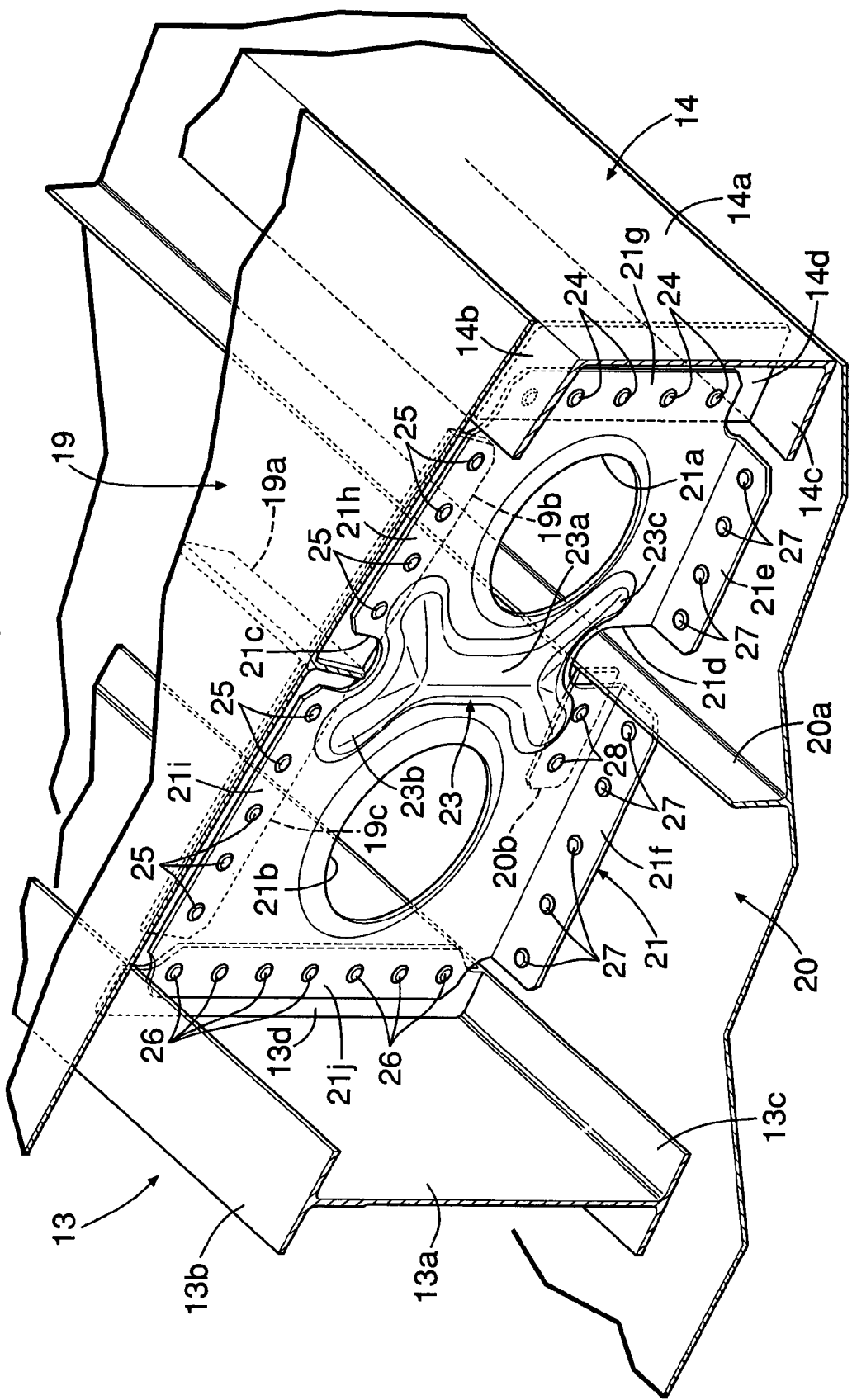
FIG. 4 is a partially cutaway perspective view of the main wing.

As shown in FIGS. 1 and 2, a main wing 12 is supported on a fuselage 11 of an aircraft, and includes a main spar 13 extending substantially in the span direction, a front spar 14 arranged in front of the main spar 13, and a rear spar 15 arranged in the rear of the main spar 13. A leading edge member 16 is fixed in front of the main spar 13. A flap 7 is oscillatably supported on a trailing edge part of the main wings 12 on an inner side in the span direction. An aileron 16 is oscillatably supported on the trailing edge part of the main wings 12 on an outer side in the span direction.

An upper skin 19, that defines the upper surface of the main wing 12, includes a plurality of stringers 19a formed integrally on the lower surface thereof in the span direction. A lower skin 20 that defines the lower surface of the main wing 12 includes a plurality of stringers 20a formed integrally on the upper surface thereof in the span direction.

The main spar 13 comprises a member having an I-shaped cross section which includes a web 13a and a pair of upper and lower flanges 13b and 13c. The front spar 14 comprises a member having a groove-shaped cross section which includes a web 14a and a pair of upper and lower flanges 14b and 14c. Although not shown, also the rear spar 15 comprises a member having an I-shaped cross section similar to that of the main spar 13.

The main spar 13 and the front spar 14 are connected to each other by a plurality of front ribs 21 arranged in the chord direction. The main spar 13 and the rear spar 15 are connected to each other by a plurality of rear ribs 22 arranged in the chord direction. Each of the front rib 21 and the rear rib 22 is a member formed by press molding a metallic plate, and has a shape for defining the shape of the airfoil of the main wing 12. Because the front rib 21 and the rear rib 22 have substantially the same structure except for a minor difference in shape, the structure of the front rib 21 will be described below.

The front rib 21 is a substantially rectangular plate-shaped member having a slightly lower leading edge. Two lightening holes 21a and 21b are formed in the front and rear parts of the front rib 21 in order to reduce the weight. A vertically-extending bead 23 is integrally press-molded between the two lightening holes 21a and 21b. The bead 23 integrally includes a vertically-extending straight part 23a and a pair of arcuate parts 23b and 23c formed at opposite ends in the vertical direction of the straight part 23a. The bead 23 is formed so as to bulge inwardly in the span direction when the front rib 21 is press-molded.

Formed in the central portion of the upper edge of the front rib 21 is a stringer through hole 21c through which the stringer 19a formed on the lower surface of the upper skin 19 passes. Formed in the central portion of the lower edge of the front rib 21 is a stringer through hole 21d through which the stringer 20a formed on the upper surface of the lower skin 20 passes. A pair of front and rear flanges 21e and 21f bent inward in the span direction are formed on opposite sides in the front/rear direction of the stringer through hole 21d on the lower edge of the front rib 21.

A mounting part 21g provided at the front end of the front rib 21 is fixed by rivets 24 to a plate-shaped mounting part 14d which connects the web 14a to the pair of upper and lower flanges 14b and 14c of the front spar 14. A pair of front and rear mounting parts 21h and 21i provided at the upper edge of the front rib 21 are fixed by rivets 25 to mounting parts 19b and 19c which are formed on the lower surface of the upper skin 19.

A mounting part 21j provided at the rear end of the front rib 21 is fixed by rivets 26 to a plate-shaped mounting part 13d which connects the web 13a to the pair of upper and lower flanges 13b and 13c of the main spar 13. The pair of front and rear flanges 21e and 21f provided at the lower edge of the front rib 21 are fixed by rivets 27 to the lower skin 20.

A bracket 20b, integrally provided on the stringer 20a of the lower skin 20, is fixed by rivets 28 to the front rib 21.

Thus, even when a lift in the vertical direction or a drag in the front/rear direction acting on the main wing 12 during the flight makes an attempt to buckle the front rib 21 whose outer periphery is connected to the main spar 13, the front spar 14, the upper skin 19 and the lower skin 20, the main wing 12 is prevented from being deformed because the buckling rigidity against a shear load is enhanced by the bead 23 formed on the front rib 21. More specifically, although the buckling strength decreases because the front rib 21 has the stringer through holes 21c and 21d through which the stringers 19a and 20a of the upper skin 19 and the lower skin 20 pass, respectively, the buckling strength of the front rib 21 against the shear load is effectively enhanced because the arcuate parts 23b and 23c are formed at opposite ends in the vertical direction of the straight part 23a of the bead 23 so as to surround the stringer through holes 21c and 21d.

FIG. 5 shows the relationship between allowable shear load and the thickness of the front rib 21 of the present embodiment and three comparative examples. Comparative Example (1) is the front rib 21 having no bead 23, Comparative Example (2) is the front rib 21 having the straight part 23a only and no arcuate parts 23b and 23c, and Comparative Example (3) is the front rib 21 having the arcuate parts 23b and 23c only and no straight part 23a.

As is clearly shown in the graph of FIG. 5, in all the thicknesses, the shear stress acting on the front rib 21 are in the following decreasing order: the present embodiment<Comparative Example (3)<Comparative Example (2)<Comparative Example (1).

Thus, the present embodiment could endure the largest allowable shear load, showing that the present embodiment has an increased strength.

The embodiment of the present invention has been described above, however various changes in design may be made without departing from the subject matter of the present invention.

For example, in this embodiment, a detailed description has been made on the front rib 21, however, the present invention is also applicable to the rear rib 22 in the same way. Also, the rib according to the present invention may be a rib that is not divided and integrally continuous from the leading edge part to the trailing edge part.

Further, in this embodiment, the stringers 19a and 20a are integrally formed on the upper skin 19 and the lower skin 20, however, the stringers 19a and 20a may be formed as members separate from the upper skin 19 and the lower skin 20 and connected to the skins 19 and 20 by rivets or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A wing structure for an aircraft, comprising:
a plurality of spars extending in a span direction;
a plurality of stringers arranged between the spars and extending in the span direction;
a rib extending in a chord direction to connect the spars to each other; and
skins for covering upper and lower surfaces of the spars, the stringers and the rib;
wherein upper and lower stringer through holes through which the stringers pass are formed on upper and lower edges of the rib;
wherein a bead is formed on the rib so as to extend between the upper and lower stringer through holes which face each other in a vertical direction, said bead including a straight portion, an upper end and a lower end; and
wherein each of the upper and lower ends of the bead are formed into arcuate shapes including a forwardly projecting portion extending beyond the straight portion and a rearwardly projecting portion extending beyond the straight portion so as to surround the upper and lower stringer through holes, respectively.

2. The wing structure for an aircraft according to claim 1, wherein at least one aperture is formed in said rib for lightening the weight of the rib.

3. The wing structure for an aircraft according to claim 2, wherein said at least one aperture comprises an aperture formed in a portion of said rib adjacent to a front spar and an aperture formed in a portion of said rib adjacent to a rear spar.

4. The wing structure for an aircraft according to claim 1, wherein said bead is a vertically extending bead that is integrally press-molded between two lightening apertures formed in the rib.

5. The wing structure for an aircraft according to claim 1, wherein said straight portion is a vertically-extending substantially straight portion and said arcuate shapes are a pair of arcuate portions formed at opposite ends in the vertical direction of the substantially straight portion.

6. The wing structure for an aircraft according to claim 1, wherein the bead is formed to bulge inwardly in the span direction when the rib is press-molded.

7. The wing structure for an aircraft according to claim 1, and further including a pair of front and rear flanges bent inwardly in the span direction and formed on opposite sides in the front and rear direction of the stringer through holes on a lower edge of the rib for securing the rib to a lower surface of the wing.

8. The wing structure for an aircraft according to claim 7, and further including a mounting portion disposed at a front end of the rib for securing the rib to a portion of a front spar.

9. The wing structure for an aircraft according to claim 7, and further including a pair of front and rear mounting portions provided at an upper edge of the rib for securing the rib to an upper skin of the wing.

10. The wing structure for an aircraft according to claim 7, and further including a mounting portion provided at a rear of the rib for securing the rib to a main spar.

11. A wing structure for an aircraft, comprising:
a plurality of spars extending in a span direction;
a plurality of stringers arranged between the spars and extending in the span direction;
a rib extending in a chord direction to connect the spars to each other; and
an upper skin for covering an upper surface of the spars, the stringers and the rib;
a lower skin for covering a lower surface of the spars, the stringers and the rib;
an upper stringer through hole on an upper edge of the rib for enabling a stringer to pass therethrough;
a lower stringer through hole on a lower edge of the rib for enabling a stringer to pass therethrough;
a bead formed on the rib and extending between the upper and lower stringer through holes which face each other in a vertical direction, said bead including a straight portion, an upper end and a lower end; and
arcuate shapes being formed in each of said upper and lower ends of the bead said arcuate shapes including a forwardly projecting portion extending beyond the straight portion and a rearwardly projecting portion extending beyond the straight portion for surrounding the upper and lower stringer through holes, respectively.

12. The wing structure for an aircraft according to claim 11, wherein at least one aperture is formed in said rib for lightening the weight of the rib.

13. The wing structure for an aircraft according to claim 12, wherein said at least one aperture comprises an aperture formed in a portion of said rib adjacent to a front spar and an aperture formed in a portion of said rib adjacent to a rear spar.

14. The wing structure for an aircraft according to claim 11, wherein said bead is a vertically extending bead that is integrally press-molded between two lightening apertures formed in the rib.

15. The wing structure for an aircraft according to claim 11, wherein said straight portion is a vertically-extending substantially straight portion and said arcuate shapes are a pair of arcuate portions formed at opposite ends in the vertical direction of the substantially straight portion.

16. The wing structure for an aircraft according to claim 11, wherein the bead is formed to bulge inwardly in the span direction when the rib is press-molded.

17. The wing structure for an aircraft according to claim 11, and further including a pair of front and rear flanges bent inwardly in the span direction and formed on opposite sides in the front and rear direction of the stringer through holes on a lower edge of the rib for securing the rib to a lower surface of the wing.

18. The wing structure for an aircraft according to claim 17, and further including a mounting portion disposed at a front end of the rib for securing the rib to a portion of a front spar.

19. The wing structure for an aircraft according to claim 17, and further including a pair of front and rear mounting portions provided at an upper edge of the rib for securing the rib to an upper skin of the wing.

20. The wing structure for an aircraft according to claim 17, and further including a mounting portion provided at a rear of the rib for securing the rib to a main spar.

* * * * *